US012062322B2

(12) United States Patent
Huang

(10) Patent No.: US 12,062,322 B2
(45) Date of Patent: Aug. 13, 2024

(54) SIGNAL GENERATION APPARATUS, DRIVING CHIP, DISPLAY SYSTEM AND LED DISPLAYING DRIVING METHOD

(71) Applicant: Chipone Technology (Beijing) Co., Ltd., Beijing (CN)

(72) Inventor: Zhizheng Huang, Beijing (CN)

(73) Assignee: CHIPONE TECHNOLOGY (BEIJING) CO., LTD., Beijing (CN)

( * ) Notice: Subject to any disclaimer, the term of this patent is extended or adjusted under 35 U.S.C. 154(b) by 55 days.

(21) Appl. No.: 17/500,786

(22) Filed: Oct. 13, 2021

(65) Prior Publication Data

US 2022/0059023 A1 Feb. 24, 2022

Related U.S. Application Data

(63) Continuation of application No. PCT/CN2020/076358, filed on Feb. 24, 2020.

(30) Foreign Application Priority Data

Dec. 27, 2019 (CN) ........................ 201911383142.X
Aug. 13, 2020 (CN) ........................ 202010814947.1

(51) Int. Cl.
*G09G 3/32* (2016.01)

(52) U.S. Cl.
CPC ....... *G09G 3/32* (2013.01); *G09G 2310/0297* (2013.01); *G09G 2310/06* (2013.01); *G09G 2310/08* (2013.01)

(58) Field of Classification Search
CPC ........... G09G 3/2014; G09G 2330/021; G09G 3/2081; G09G 2320/064; G09G 2360/16;
(Continued)

(56) References Cited

U.S. PATENT DOCUMENTS 8,917,029 B2 * 12/2014 Chu ........................ H05B 45/46
345/82
9,118,311 B1 * 8/2015 Lancaster .............. H03K 5/159
(Continued)

FOREIGN PATENT DOCUMENTS

CN 102932985 2/2013
CN 105764204 7/2016
(Continued)

OTHER PUBLICATIONS

Patent Gazette No. 10-2019-0122123 (Oct. 29, 2019).

*Primary Examiner* — Benjamin X Casarez
(74) *Attorney, Agent, or Firm* — Treasure IP Group, LLC

(57) ABSTRACT

A signal generation apparatus, a driving chip, a display system and an LED displaying driving method are described. A circuit comprises a first generation device for generating a first PWM wave with period T1; a second generation device for generating a delayed clock signal with period T2, T1=NT2, the first time is delayed by F×T2 compared with the second time, the first time is the time corresponding to a first rising edge of the delayed clock signal, the second time is the time corresponding to a first rising edge of the first PWM wave; a third generation device for generating a third PWM wave with period T3 according to the first PWM wave the delayed clock signal, T3=T1+F×T2, a first rising edge of the third PWM wave is synchronous with the first rising edge of the first PWM wave.

14 Claims, 4 Drawing Sheets

(58) Field of Classification Search
CPC ............... G09G 3/2018; G09G 3/3406; G09G 2320/0247; G09G 2310/08; G09G 3/3413; G09G 2320/0646; G09G 2320/0271; G09G 2320/043; G09G 2320/0233; G09G 2320/0252; G09G 2320/0257; G09G 3/34; G09G 2320/0242; G09G 3/32; G09G 2310/0297; G09G 2310/06; G09G 3/2025; H04N 1/00082; H05B 45/325
See application file for complete search history.

(56) References Cited

U.S. PATENT DOCUMENTS

| | | | | |
|---|---|---|---|---|
| 2011/0141780 | A1* | 6/2011 | O'Malley | H03K 5/133 363/123 |
| 2012/0112655 | A1* | 5/2012 | Ryu | G09G 3/3406 315/291 |
| 2013/0009557 | A1* | 1/2013 | Szczeszynski | H05B 31/50 315/186 |
| 2019/0311673 | A1 | 10/2019 | Li et al. | |
| 2020/0312233 | A1* | 10/2020 | Yen | G09G 3/3266 |
| 2021/0012717 | A1* | 1/2021 | Park | G09G 3/20 |

FOREIGN PATENT DOCUMENTS

| | | | |
|---|---|---|---|
| CN | 106348331 | A | 1/2017 |
| CN | 109545125 | | 3/2019 |
| CN | 110164351 | A | 8/2019 |
| WO | 2018098036 | | 5/2018 |

* cited by examiner

SIGNAL GENERATION APPARATUS, DRIVING CHIP, DISPLAY SYSTEM AND LED DISPLAYING DRIVING METHOD

CROSS-REFERENCE TO RELATED APPLICATION

This application claims priority to the Chinese Patent Application No. 201911383142.X, filed on Dec. 27, 2019 and entitled "signal generation apparatus, driving chip, display system and LED displaying driving method", and the Chinese Patent Application No. 202010814947.1, filed on Aug. 13, 2020 and entitled "signal generation apparatus, driving chip, display system and LED displaying driving method", which are incorporated herein by reference in its entirety in this disclosure.

BACKGROUND OF THE DISCLOSURE

Field of Technology

The present disclosure relates to the technical field of display, in particular to a signal generation apparatus, driving chip, display system and LED displaying driving method.

Description of the Related Art

PWM constant current driving realizes adjustment of gray scale by adjusting a time that LED is turned on, and is a driving method widely used in the LED at present.

Due to differences between the LEDs of a same model, a current and a voltage of the LED is required different from that of another LED to achieve a same gray scale, so that the gray scale of different LEDs is different when output currents and pulse widths provided by a constant current driver integrated circuit (IC) are respectively the same.

In order to solve above problem, an LED control system is used for correcting an LED screen point by point. A general method is to measure a display brightness of each LED through a gray scale detection instrument when displaying a highest gray scale, and multiply a pulse width modulation of each LED by a corresponding coefficient according to a test result, that is, reduce the pulse width of a brighter LED to achieve the same gray scale. It is possible to achieve the same gray scale of all LEDs through multiple iterations, and the obtained coefficients will be applied to display of all gray scales. This method has a great compensation effect when displaying high gray scale, however, when displaying low gray scale, using this method to compensate may cause display effect to deteriorate. For example, to display an image with a gray scale of 10, the pulse width corresponding to a display gray scale of LED A becomes 9.4 T after compensation, and the pulse width corresponding to a display gray scale of LED lamp B becomes 9.6 T after compensation. In fact, the difference between the two lights is only 0.2 T, but an accuracy of the gray scale is limited, taking a commonly used 16 bit as an example, an existing controller only sends an integer part, and an LED driver chip only handles the integer part, so the gray scale of the LED A becomes 9 after rounding, and the gray scale of the LED light B becomes 10, which causes an actual display brightness difference between the two LEDs to become larger. Wherein, GCLK (Global CLK) represents a gray-scale clock, and T represents one cycle of the gray-scale clock.

Above information disclosed in the description of the related art is only used to strengthen understanding of the related art described herein. Therefore, the related art may contain certain information, which does not form a prior art known in country for those skilled in the art.

SUMMARY

In order to solve the problem that it is difficult to accurately compensate for low grayscale display in the prior art, the present disclosure provides a signal generation apparatus, a driving chip, a display system, and an LED display driving method.

According to a first aspect of an embodiment of the present disclosure, a signal generation apparatus is provided and including: a first generation device for generating a first PWM wave, a period of the first PWM wave is T1; a second generation device for generating a delayed clock signal, a period of the delayed clock signal is T2, $T1=NT2$, N is a positive integer greater than zero, a time difference between a first time and a second time is $F\times T2$, F is greater than zero and less than one, the first time is a time corresponding to a first rising edge of the delayed clock signal, and the second time is a time corresponding to a first rising edge of the first PWM wave; and a third generation device electrically connected to the first generation device and the second generation device, and is for generating a third PWM wave according to the first PWM wave and the delayed clock signal, a period of the third PWM wave is T3, $T3=MT2\pm F\times T2$, M is a positive integer greater than zero.

Optionally, $T3=T1+F\times T2$, a first rising edge of the third PWM wave is synchronous with a predetermined rising edge, in a case of $T3=T1+F\times T2$, the predetermined rising edge is one of the first rising edge of the first PWM wave and the first rising edge of the delayed clock signal who first occurs, in a case of $T3=T1-F\times T2$, the predetermined rising edge is one of the first rising edge of the first PWM wave and the first rising edge of the delayed clock signal who last occurs.

Optionally, the third generation device includes: a first sub-generation device having a first input terminal and a second input terminal, the first input terminal is electrically connected to an output terminal of the first generation device, the second input terminal is electrically connected to an output terminal of the second generation device, the first sub-generation device is for generating a second PWM wave, a period of the second PWM wave is T4, and $T4=T1$, a first rising edge of the second PWM wave is synchronous with the first rising edge of the delayed clock signal; a second sub-generation device having a third input terminal and a fourth input terminal, the third input terminal is electrically connected to the output terminal of the first generation device, the fourth input terminal is electrically connected to an output terminal of the first sub-generation device, the second sub-generation device is for generating the third PWM wave according to the second PWM wave and the first PWM wave.

Optionally, the first sub-generation device includes a trigger.

Optionally, the second sub-generation device includes a NAND gate, an OR gate, an AND gate, or the OR gate and the AND gate.

Optionally, the first generation device includes a PWM wave generator.

Optionally, the second generation device includes a multiplexer.

Optionally, the second generation device includes an 8-input 1-output multiplexer.

According to a second aspect of an embodiment of the present disclosure, a driving chip is provided and including the above signal generation apparatus.

According to a third aspect of an embodiment of the present disclosure, a display system is provided and including an LED and the above driving chip.

According to a fourth aspect of an embodiment of the present disclosure, an LED displaying driving method is provided and including: sending data to the above driving chip by a controller, the data includes a first part of data and a second part of data, the second part of data is for characterizing data that is a fractional multiple of a clock signal period, and the first part of data is for characterizing data that is an integer multiple of the clock signal period; generating a corresponding PWM wave according to the data by the signal generation apparatus of the driving chip.

In the embodiment of the present disclosure, the first generation device generates the first PWM wave of an integer number of clock signal cycles, that is, $PWM_N$, the second generation device generates the delayed clock signal GCLK (that is, generates a delayed clock signal, the first rising edge of the delayed clock signal is delayed compared to a first rising edge of an initial clock signal GCLK<0>, and a delay time is F×T2, the first rising edge of the initial clock signal GCLK<0> is synchronized with the first rising edge of the first PWM wave $PWM_N$, so that phase of the delayed clock signal is not synchronized with the first PWM wave), the third generation device generates the third PWM wave, the period of the third PWM wave is the period of the first PWM wave and the time difference between the first time and the second time. Since the delay of the generated clock signal relative to the initial clock signal is less than one cycle of the clock signal, and the first rising edge of the initial clock signal GCLK<0> and the first rising edge of the first PWM wave $PWM_N$ are synchronized or an integral multiple of the phase difference clock signal, the period of the third PWM wave generated by this circuit is the period of an integer number of clock signals plus a period of less than one clock signal, that is, the period of the clock signal including integer multiples and fractional multiples of the clock signal period. Therefore, the circuit can generate a PWM wave with a fractional part of the data, and then it can use the PWM wave to control an operation of the LED, and can accurately compensate for the gray scale of the LED. This circuit can not only compensate for high gray scale LEDs, but also can compensate for low gray scale LEDs, and is especially suitable for compensating low gray scale LEDs, and solve the problem that it is difficult to accurately compensate the low grayscale LED display in the prior art. This solution improves the accuracy of low gray scale under a condition that require of additional components and controller design overhead are small.

BRIEF DESCRIPTION OF THE DRAWINGS

The drawings of the specification forming a part of the disclosure are used to provide a further understanding of the disclosure, and the exemplary embodiments and descriptions of the disclosure are used to explain the disclosure, and do not constitute an improper limitation of the disclosure. In the drawings.

Wherein, the above drawings include the following reference signs:

10—first generation device; 20—a second generation device; 30—a third generation device; 31—a first sub-generation device; 32—a second sub-generation device.

DETAILED DESCRIPTION OF THE DISCLOSURE

It should be noted that the embodiments in this disclosure and the features in the embodiments can be combined with each other if there is no conflict. Hereinafter, the present disclosure will be described in detail with reference to the drawings and in conjunction with the embodiments.

In order to enable those skilled in the art to better understand the solution of the present disclosure, the technical solutions in the embodiments of the present disclosure will be described clearly and completely in conjunction with the accompanying drawings in the embodiments of the present disclosure. Obviously, the described embodiments are only a part of the embodiments of the present disclosure, rather than all the embodiments. Based on the embodiments in this disclosure, all other embodiments obtained by those of ordinary skill in the art without creative work should fall within the protection scope of this disclosure.

It should be noted that the terms "first" and "second" in the specification and claims of this disclosure and the above mentioned drawings are used to distinguish similar objects, and are not necessarily used to describe a specific sequence or sequence. It should be understood that the data used in this way can be interchanged under appropriate circumstances for the purposes of the embodiments of the present disclosure described herein. In addition, the terms "including" and "having" and any variations of them are intended to cover non-exclusive inclusions. For example, a process, method, system, product, or device that includes a series of steps or units is not necessarily limited to those clearly listed. Those steps or units may include other steps or units that are not clearly listed or are inherent to these processes, methods, products, or equipment.

It should be understood that when an element (such as a layer, film, region, or substrate) is described as is "on" another element, the element can be directly on the other element, or intervening elements may also be present. Moreover, in the specification and claims, when it is described that an element is "connected" to another element, the element can be "directly connected" to the other element, or "connected" to the other element through a third element.

Figure 1:
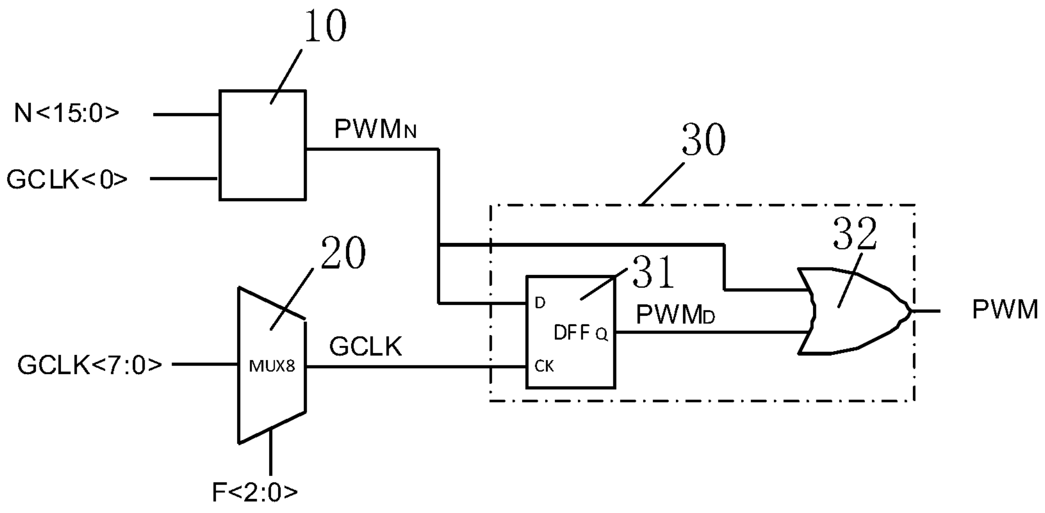
FIG. 1 shows a schematic diagram of a signal generation apparatus according to an embodiment of the present disclosure.
Figure 2A:
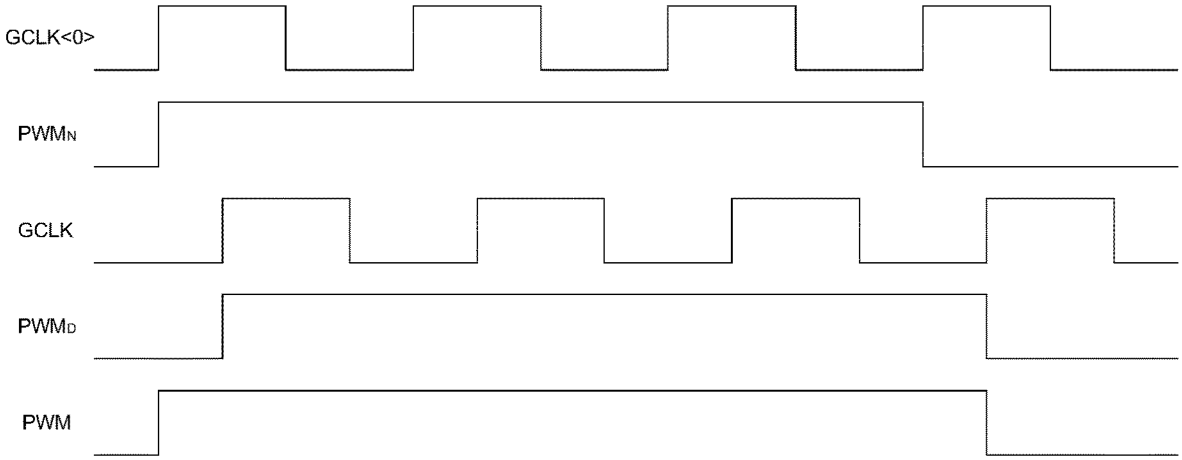
FIGS. 2(*a*), 2(*b*), 2(*c*) and 2(*d*) show schematic diagrams of waveform changes in a PWM wave generation process according to four embodiments of the present disclosure.
Figure 2B:
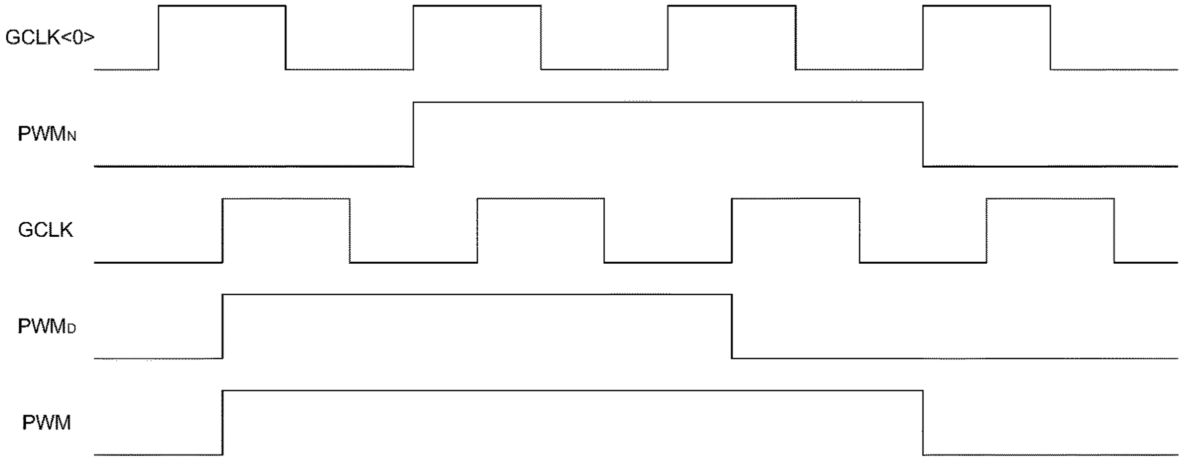
Figure 2C:
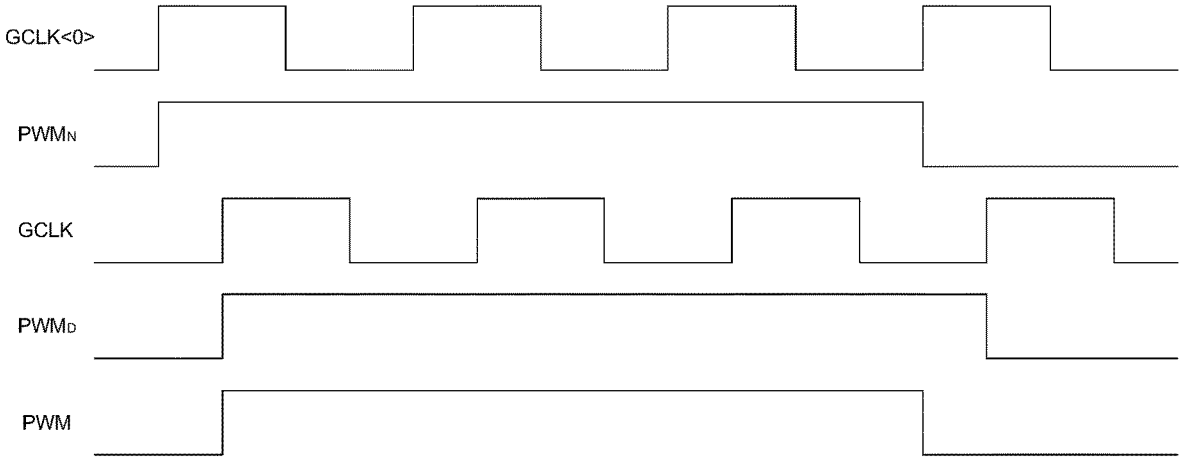
Figure 2D:
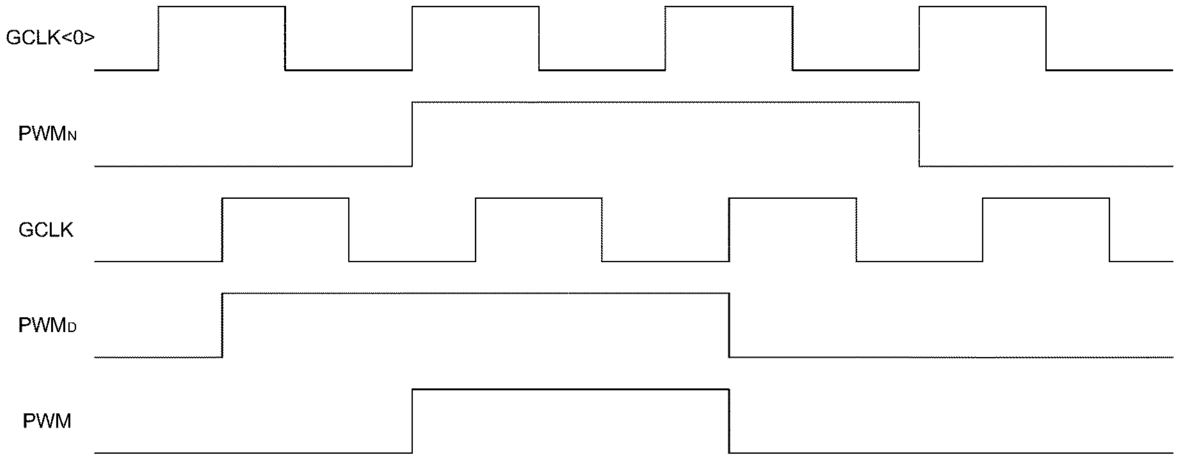

FIG. 1 shows a schematic diagram of a signal generation apparatus according to an embodiment of the present disclosure, as shown in FIG. 1.

The signal generation apparatus includes a first generation device 10, a second generation device 20 and a third generation device 30, wherein, the first generation device 10 is configured for generating a first PWM wave, a period of the first PWM wave is T1; the second generation device 20 is configured for generating a delayed clock signal, a period of the delayed clock signal is T2, T1=NT2, N is a positive integer greater than zero, that is, the period of the first PWM wave is an integer multiple of the period of the delayed clock signal, a time difference between a first time and a second time is F×T2 (wherein "×" is a multiplication sign), In above circuit, the first generation device generates the first PWM wave of an integer number of clock signal cycles, as $PWM_N$ shown in FIGS. 2(*a*), 2(*b*), 2(*c*) and 2(*d*), the second generation device generates the delayed clock signal GCLK (that is, generates a delayed clock signal, the first rising edge of the delayed clock signal is delayed compared to a first rising edge of an initial clock signal GCLK<0>, and a delay time is F×T2, the first rising edge of the initial clock signal GCLK<0> is synchronized with the first rising edge of the first PWM wave $PWM_N$, as shown in FIGS. 2(*a*), 2(*b*), 2(*c*) and 2(*d*), so that phase of the delayed clock signal is not synchronized with the first PWM wave), the third generation device generates the third PWM wave, the period of the third PWM wave is the period of the first PWM wave and the time difference between the first time and the second time. Since the delay of the generated clock signal relative to the initial clock signal is less than one cycle of the clock signal, and the first rising edge of the initial clock signal GCLK<0> and the first rising edge of the first PWM wave $PWM_N$ are synchronized or an integral multiple of the phase difference clock signal, the period of the clock signal including an integer part and a fractional part, and the fractional part is decided by F×T2. Therefore, the circuit can generate a PWM wave with the fractional part of the data, and then it can use the PWM wave to control an operation of an LED, and can accurately compensate for a gray scale of the LED. This circuit can not only compensate for high gray scale LEDs, but also can compensate for low gray scale LEDs, and is especially suitable for compensating low gray scale LEDs, and solve the problem that it is difficult to accurately compensate the low grayscale LED display in the prior art. This solution improves the accuracy of low gray scale under a condition that require of additional components and controller design overhead are small.

It should be noted that the above mentioned M may be equal to N or not equal to N, and may be specifically determined according to actual requirements. Those skilled in the art can design circuits according to actual requirements to make the two the same or different.

In a specific embodiment of the present disclosure, in a case of T3=T1+F×T2, that is, N=M, a first rising edge of the third PWM wave is synchronous with a predetermined rising edge, in a case of T3=T1+F×T2, the predetermined rising edge is one of the first rising edge of the first PWM wave and the first rising edge of the delayed clock signal who first occurs, in a case of T3=T1−F×T2, the predetermined rising edge is one of the first rising edge of the first PWM wave and the first rising edge of the delayed clock signal who last occurs. Specifically, above scheme specifically includes four situations:

In a first situation, as shown in FIG. 2(*a*), in this embodiment, the first rising edge of the delayed clock signal is delayed by F×T2 compare to the first rising edge of the first PWM wave, the period T3 of the third PWM wave generated by the third generation device is equal to T1+F×T2, and the first rising edge of the third PWM wave is synchronized with the first rising edge of the first PWM wave (because the one of the first rising edge of the first PWM wave and the first rising edge of the delayed clock signal who first occurs is the first rising edge of the first PWM wave);

In a second situation, as shown in FIG. 2(*b*), in this embodiment, the first rising edge of the delayed clock signal is F×T2 earlier than the first rising edge of the first PWM wave, the period T3 of the third PWM wave generated by the third generation device is equal to T1+F×T2, and the first rising edge of the third PWM wave is synchronized with the first rising edge of the delayed clock signal (because the one of the first rising edge of the first PWM wave and the first rising edge of the delayed clock signal who first occurs is the first rising edge of the delayed clock signal);

In a third situation, as shown in FIG. 2(*c*), in this embodiment, the first rising edge of the delayed clock signal is delayed by F×T2 compare to the first rising edge of the first PWM wave, the period T3 of the third PWM wave generated by the third generation device is equal to T1−F×T2, and the first rising edge of the third PWM wave is synchronized with the first rising edge of the delayed clock signal (because the one of the first rising edge of the first PWM wave and the first rising edge of the delayed clock signal who last occurs is the first rising edge of the delayed clock signal);

In a fourth situation, as shown in FIG. 2(*d*), in this embodiment, the first rising edge of the delayed clock signal is F×T2 earlier than the first rising edge of the first PWM wave, the period T3 of the third PWM wave generated by the third generation device is equal to T1−F×T2, and the first rising edge of the third PWM wave is synchronized with the first rising edge of the first PWM wave (because the one of the first rising edge of the first PWM wave and the first rising edge of the delayed clock signal who last occurs is the first rising edge of the first PWM wave).

The third generation device 30 in this disclosure may be any device that generates the third PWM wave according to the first PWM wave and the delayed clock signal, and those skilled in the art can select a suitable device to generate the corresponding third PWM wave according to an actual situation.

In an embodiment of the present disclosure, as shown in FIG. 1, the third generation device 30 includes a first sub-generation device 31 and a second sub-generation device 32, wherein, the first sub-generation device 31 having a first input terminal and a second input terminal, the first input terminal is electrically connected to an output terminal of the first generation device 10, the second input terminal is electrically connected to an output terminal of the second generation device 20, the first sub-generation device 31 is configured for generating a second PWM wave, a period of the second PWM wave is T4, and T4=T1, a first rising edge of the second PWM wave is synchronous with the first rising edge of the delayed clock signal; the second sub-generation device 32 having a third input terminal and a fourth input terminal, the third input terminal is electrically connected to the output terminal of the first generation device 10, the fourth input terminal is electrically connected to an output terminal of the first sub-generation device 31, the second sub-generation device is for generating the third PWM wave according to the second PWM wave and the first PWM wave. In this embodiment, the third generation device 30 can generate the third PWM wave only through the first sub-generation device and the second sub-generation device, with a simple circuit structure and high efficiency.

The above mentioned first sub-generation device and second sub-generation device of the present disclosure may be any feasible device and circuit in the prior art, and those skilled in the art can select appropriate a device or circuit as the corresponding first sub-generation device and the second sub-generation device according to actual conditions. Specifically, a latch and a NAND gate can be used as the first sub-generation device and the second sub-generation device.

In a specific embodiment of the present disclosure, the above mentioned first sub-generation device 31 includes a trigger. Specifically, it may be a D-type flip-flop. As shown in FIG. 1, the flip-flop generates a corresponding $PWM_D$ wave according to the first PWM wave and the delayed clock signal GCLK.

Similarly, the above mentioned second sub-generation device of the present disclosure may be any feasible device and circuit in the prior art, and those skilled in the art can select a suitable circuit or device as the second sub-generation device according to actual conditions.

In another specific embodiment of the present disclosure, the above mentioned second sub-generation device includes an OR gate or an AND gate, the OR gate is also called an OR circuit. If one of several conditions is met, an event will occur, this relationship is called an "or" logic relationship, and a circuit with the "or" logic relationship is called an OR gate. When the third input terminal and the fourth input terminal have a high level (logic 1), the output is high level (logic 1). When the third input terminal and the fourth input terminal are all low level (logic 0), the output is low level (logic 0). The AND gate is also called the AND circuit. If all of conditions are met, an event will occur, this relationship is called an "and" logical relationship, and a circuit with the "and" logical relationship is called an AND gate. When the third input terminal and the fourth input terminal are both high level (logic 1), the output is high level (logic 1), when one of the third input terminal and the fourth input terminal is low level (logic 0), the output is low level (Logic 0). In this solution, the third PWM wave may be generated according to the second PWM wave and the first PWM wave only through one OR gate or one AND gate, with a simple circuit structure and high efficiency. FIG. 1 shows the apparatus corresponding to the OR gate, the apparatus mainly implements schemes of FIGS. 2(*a*) and 2(*b*). The device corresponding to the AND gate is not shown in this disclosure, and the apparatus corresponding to the AND gate mainly implements schemes of FIG. 2 (C) and FIG. 2(*d*).

Of course, the above mentioned second sub-generation device of the present disclosure is not limited to only include AND gates and OR gates, and may also include both at the same time, and may also include other devices. Those skilled in the art can select a suitable device according to an actual situation to form the second sub-generation device of the present disclosure.

It should be noted that the first generation device and the second generation device in this disclosure can be any feasible devices and circuits in the prior art, those skilled in the art can select appropriate circuit or device as the first generation device and the second generation device according to an actual condition.

In a specific embodiment of the present disclosure, as shown in FIG. 1, the above mentioned first generation device 10 includes a PWM wave generator for generating the first PWM wave.

Figure 3:
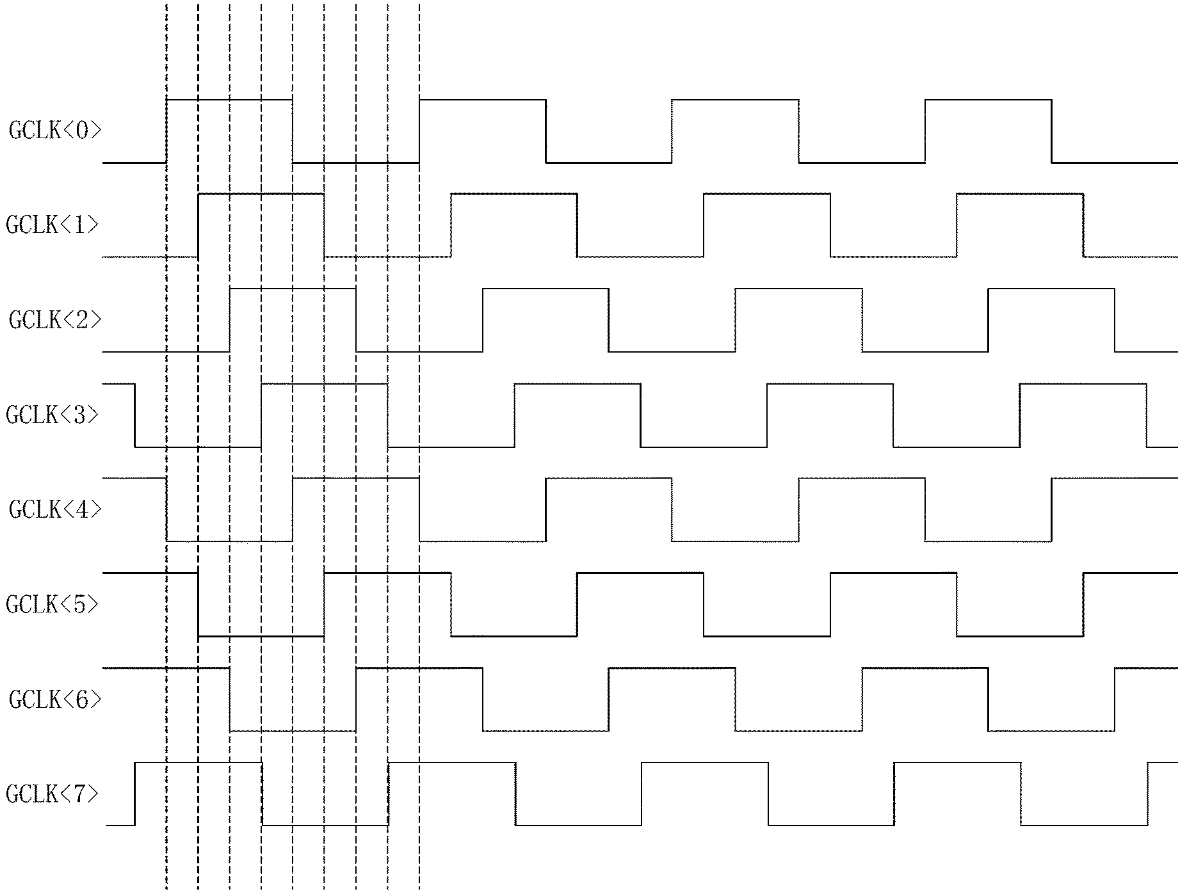
FIG. 3 shows a schematic diagram of an 8-phase GCLK waveform according to an embodiment of the present disclosure.

In another embodiment of the present disclosure, as shown in FIG. 1, the above mentioned second generation device 20 is a multiplexer. According to a given input address code, the multiplexer selects a designated one from a group of input signals and sends it to a combinational logic circuit of the output terminal. In a more specific embodiment, the above mentioned second generation device 20 includes an 8-input 1-output multiplexer. In this circuit, a GCLK clock with 8 phases is employed, and there are 8 types of input data, and one of them is selected as an output. The corresponding 8-phase GCLK clock signal is shown in FIG. 3. Specifically, the 8-phase GCLK clock signal can be generated by any method such as Phase Locked Loop (PLL), phase interpolator or Dynamic Link Library (DLL).

It should be noted that the multiplexer is not limited to the 8-input 1-output multiplexer in this disclosure, and other suitable multiplexers may be selected according to an actual situation, such as a 4-input 1-output multiplexer, and a 16-input 1-output multiplexer.

Figure 4:
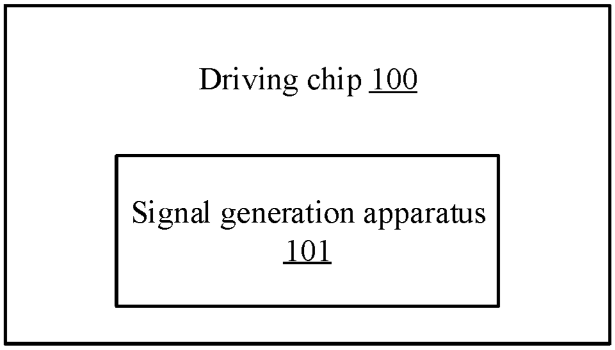
FIG. 4 shows a block diagram of a driving chip in according to an embodiment of the present disclosure.

As shown in FIG. 4, an embodiment of the present disclosure further provides a driving chip 100, including a signal generation apparatus 101, and the signal generation apparatus is any of the above mentioned signal generation apparatuses.

Since the driving chip 100 includes the above mentioned signal generation apparatus, it can achieve an effect of accurately compensating for grayscale display, and is especially suitable for low gray scale display solutions.

Figure 5:
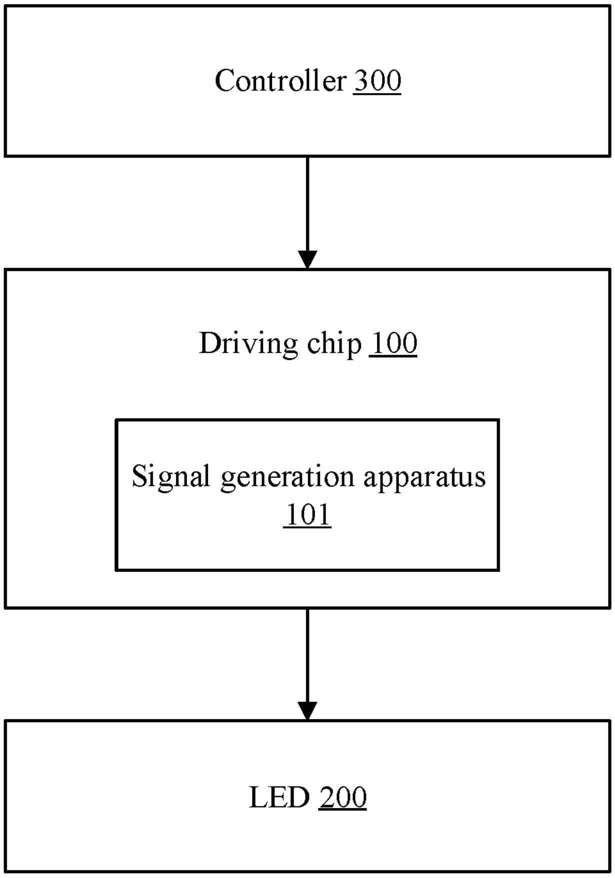
FIG. 5 shows a block diagram of a display system in according to an embodiment of the present disclosure.

As shown in FIG. 5, an embodiment of the present disclosure further provides a display system, including an LED 200 and a driving chip 100, the driving chip is the above mentioned driving chip.

The display system includes the LED 200 and the driver chip 100, and the driver chip 100 includes the above mentioned signal generation circuit, so that the LED 200 can be driven by the driver chip 100, and a gray scale display of the LED 200 can be accurately compensated. Specifically, the gray scale can be adjusted by adjusting a time the LED 200 is on, so that a difference in display brightness between different LEDs can be small or no difference, and a better display effect can be achieved.

In another specific embodiment of the present disclosure, the above mentioned display system further includes a controller 300 that communicates with the driving chip 100 and is configured for controlling current, timing, and configuring the driving chip.

An embodiment of the present disclosure further provides an LED displaying driving method, including:

sending data to the above driving chip by a controller, the data includes a first part of data and a second part of data, the second part of data is for characterizing data that is a fractional multiple of a clock signal period, and the first part of data is for characterizing data that is an integer multiple of the clock signal period;

generating a corresponding PWM wave according to the data by the signal generation apparatus of the driving chip.

In the driving method, firstly, sending a corresponding compensation data to the driving chip, secondly, generating the corresponding PWM wave according to the data by the driving chip, the PWM wave is for controlling the operation of the LED, enables accurate compensation of display gray levels of different LEDs, and solves the problem that it is difficult to accurately compensate for low gray levels in the prior art, so that a difference in display brightness between different LEDs can be small or no difference.

It should be noted that data acquired by a controller in the prior art also includes a first part of data and a second part of data. However, since a driving chip in the prior art cannot generate a PWM wave corresponding to the second part of the data, the controller in the prior art does not send the second part of the data to the driving chip, but only sends the first part of the data to the driving chip. In this disclosure, the corresponding signal generation apparatus can generate the PWM wave corresponding to the second part of the data. Therefore, the controller will send the first part of data and the second part of data to the of the driving chip.

In another specific embodiment of the present disclosure, the signal generation apparatus of the driving chip generates the corresponding PWM wave according to the data, including: parsing the data to obtain the first part of data and the second part of data; sending the first part of the data to the first generation device of the signal generation apparatus, and sending the second part of the data to the second generation device of the signal generation apparatus, generating PWM waves corresponding to the data by the first generation device and the second generation device.

In this disclosure, sending the data by the controller can be in two ways: 1. sending N (integer)+F (fractional) data directly to the constant current IC; 2. sending N+ fractional indicator to the constant current IC, that is, indicating the constant current IC how many digits are fractional places in the data N sent by the constant current IC. A choice of the two ways can be determined according to a complexity and a transmission efficiency of a sending end system, but no matter which one has a small impact on a data rate of the transmitted data, it will not have an impact on data transmission.

In order to enable those skilled in the art to understand the technical solutions of the present disclosure more clearly, the technical solutions of the present disclosure will be described below in conjunction with specific embodiments.

Embodiment

After the controller receives the input data from the constant current IC, it separates the first part of data from the second part of data, the first part of data is sent to the first generation device 10, and the second part of data is sent to the second generation device 20. The first generation device 10 generates according to the original PWM wave generating method, and the generated first PWM wave is the $PWM_N$ shown in each figure in FIG. 2(*a*)-2(*d*).

Generating 8 phases of GCLK clock by any method such as PLL, phase interpolator or DLL. As shown in FIG. 3, each waveform in FIG. 3 has a delay relative to the previous waveform, and each delay is ⅛, GCLK<0> is clock of the integer part of the PWM wave, and the first PWM wave generated is $PWM_N$, which is an integer multiple of the period of the GCLK. As shown in FIG. 1, the second part of data F<2:0> selects the corresponding clock signal from GCLK<7:0>, and selects the GCLK corresponding to FIG. 2(*a*)-2(*d*), which is actually the waveform of GCLK<2>, Which is delayed by ¼ cycle compared to GCLK<0> GCLK and $PWM_N$ are input to the flip-flop, and the flip-flop outputs $PWM_D$ as shown in each waves in FIG. 2(*a*)-2(*d*). $PWM_D$ and $PWM_N$ are respectively input to the OR gate, that is, when both waveforms are high level, the final output PWN waveform is high level. As shown in the waves in FIG. 2(*a*)-2(*d*), the period of the finally generated PWM wave is a sum of integer multiples of T2 and fractional multiples of T2, that is, T3=T1+F×T2, and the first rising edge of the third PWM wave is synchronized with the first rising edge of the first PWM wave. When F<2:0> is 0, that is, the second part of data is 0, $PWM_N$ goes directly to the output terminal.

The above mentioned circuit can generate the PWM wave with the fractional part of the data, and then it can use the PWM wave to control the operation of the LED, and can accurately compensate for the gray scale of the LED. This circuit can not only compensate for high gray scale LEDs, but also can compensate for low gray scale LEDs, and is especially suitable for compensating low gray scale LEDs, and solve the problem that it is difficult to accurately compensate the low grayscale LED display in the prior art. This solution improves the accuracy of low gray scale under the condition that require of additional components and controller design overhead are small.

From the above description, it can be seen that the above mentioned embodiments of the present disclosure achieve following technical effects:

1) In the circuit of the present disclosure, the first generation device generates the first PWM wave of the integer number of clock signal cycles, that is, $PWM_N$, the second generation device generates the delayed clock signal GCLK (that is, generates the delayed clock signal, the first rising edge of the delayed clock signal is delayed compared to the first rising edge of the initial clock signal GCLK<0>, and the delay time is F×T2, the first rising edge of the initial clock signal GCLK<0> is synchronized with the first rising edge of the first PWM wave $PWM_N$, so that phase of the delayed clock signal is not synchronized with the first PWM wave), the third generation device generates the third PWM wave, the period of the third PWM wave is the period of the first PWM wave and the time difference between the first time and the second time. Since the delay of the generated clock signal relative to the initial clock signal is less than one cycle of the clock signal, and the first rising edge of the initial clock signal GCLK<0> and the first rising edge of the first PWM wave $PWM_N$ are synchronized or the integral multiple of the phase difference clock signal, the period of the third PWM wave generated by this circuit is the period of the integer number of clock signals plus the period of less than one clock signal, that is, the period of the clock signal including integer multiples and fractional multiples of the clock signal period. Therefore, the circuit can generate the PWM wave with the fractional part of the data, and then it can use the PWM wave to control the operation of the LED, and can accurately compensate for the gray scale of the LED. This circuit can not only compensate for high gray scale LEDs, but also can compensate for low gray scale LEDs, and is especially suitable for compensating low gray scale LEDs, and solve the problem that it is difficult to accurately compensate the low grayscale LED display in the prior art. This solution improves the accuracy of low gray scale under the condition that require of additional components and controller design overhead are small.

2) Since the driving chip includes the above mentioned signal generation apparatus, it can achieve an effect of accurately compensating for grayscale display, and is especially suitable for low gray scale display solutions.

3) The display system of the present disclosure includes the LED and the driver chip, and the driver chip includes the above mentioned generation circuit, so that the LED can be driven by the driver chip, and a gray scale display of the LED can be accurately compensated. Specifically, the gray scale can be adjusted by adjusting a time the LED is on, so that a difference in display brightness between different LEDs can be small or no difference, and a better display effect can be achieved.

4) In the driving method of the present disclosure, firstly, sending a corresponding compensation data to the driving chip, secondly, generating the corresponding PWM wave according to the data by the driving chip, the PWM wave is for controlling the operation of the LED, enables accurate compensation of display gray levels of different LEDs, and solves the problem that it is difficult to accurately compensate for low gray levels in the prior art, so that a difference in display brightness between different LEDs can be small or no difference.

The foregoing descriptions are only preferred embodiments of the disclosure, and are not intended to limit the disclosure. For those skilled in the art, the disclosure can have various modifications and changes. Any modification, equivalent replacement, improvement, etc. made within the spirit and principle of this disclosure shall be included in the protection scope of this disclosure.

What is claimed is:

1. A signal generation apparatus comprising:

a first generation device for generating a first PWM (Pulse Width Modulation) wave based on a first part of data, a period of the first PWM wave is T1;

a second generation device for generating a delayed clock signal based on a second part of data, a period of the delayed clock signal is T2, T1=NT2, N is a positive integer greater than zero, a time difference between a first time and a second time is F×T2, F is greater than zero and less than one, the first time is a time corresponding to a first rising edge of the delayed clock signal, and the second time is a time corresponding to a first rising edge of the first PWM wave; and a third generation device electrically connected to the first generation device and the second generation device, and is for generating a third PWM wave according to the first PWM wave and the delayed clock signal, a period of the third PWM wave is T3, T3=T1±F×T2, a first rising edge of the third PWM wave is synchronous with a predetermined rising edge, wherein the second part of data is for characterizing data that is a fractional multiple of a clock signal period, and the first part of data is for characterizing data that is an integer multiple of the clock signal period, the third generation device consists of a first sub-generation device for generating a second PWM wave and a second sub-generation device for generating the third PWM wave according to the second PWM wave and the first PWM wave, the first sub-generation device is a trigger and the second sub-generation device is a NAND gate, an OR gate, an AND gate, or the OR gate and the AND gate.

2. The signal generation apparatus according to claim 1, wherein in a case of T3=T1+F×T2, the predetermined rising edge is one of the first rising edge of the first PWM wave and the first rising edge of the delayed clock signal who first occurs, in a case of T3=T1−F×T2, the predetermined rising edge is one of the first rising edge of the first PWM wave and the first rising edge of the delayed clock signal who last occurs.

3. The signal generation apparatus according to claim 2, wherein the first sub-generation device has a first input terminal and a second input terminal, the first input terminal is electrically connected to an output terminal of the first generation device, the second input terminal is electrically connected to an output terminal of the second generation device, a period of the second PWM wave is T4, and T4=T1, a first rising edge of the second PWM wave is synchronous with the first rising edge of the delayed clock signal;

the second sub-generation device has a third input terminal and a fourth input terminal, the third input terminal is electrically connected to the output terminal of the first generation device, the fourth input terminal is electrically connected to an output terminal of the first sub-generation device.

4. The signal generation apparatus according to claim 1, wherein the first generation device comprises a PWM wave generator.

5. The signal generation apparatus according to claim 4, wherein the second generation device comprises a multiplexer.

6. The signal generation apparatus according to claim 1, wherein the second generation device comprises an 8-input 1-output multiplexer.

7. A driving chip, comprising the signal generation apparatus according to claim 1.

8. The driving chip according to claim 7, wherein the driving chip provides the third PWM wave to an LED.

9. An LED displaying driving method, comprising:

sending data to the driving chip according to claim 7 by a controller, the data comprises the first part of data and the second part of data;

generating a corresponding PWM wave according to the data by the signal generation apparatus of the driving chip.

10. The driving chip according to claim 7, wherein in a case of T3=T1+F×T2, the predetermined rising edge is one of the first rising edge of the first PWM wave and the first rising edge of the delayed clock signal who first occurs, in a case of T3=T1−F×T2, the predetermined rising edge is one of the first rising edge of the first PWM wave and the first rising edge of the delayed clock signal who last occurs.

11. The driving chip according to claim 10, wherein the first sub-generation device has a first input terminal and a second input terminal, the first input terminal is electrically connected to an output terminal of the first generation device, the second input terminal is electrically connected to an output terminal of the second generation device, a period of the second PWM wave is T4, and T4=T1, a first rising edge of the second PWM wave is synchronous with the first rising edge of the delayed clock signal;

the second sub-generation device has a third input terminal and a fourth input terminal, the third input terminal is electrically connected to the output terminal of the first generation device, the fourth input terminal is electrically connected to an output terminal of the first sub-generation device.

12. The driving chip according to claim 7, wherein the first generation device comprises a PWM wave generator.

13. The driving chip according to claim 12, wherein the second generation device comprises a multiplexer.

14. The driving chip according to claim 7, wherein the second generation device comprises an 8-input 1-output multiplexer.

* * * * *